United States Patent Office 2,839,964
Patented June 24, 1958

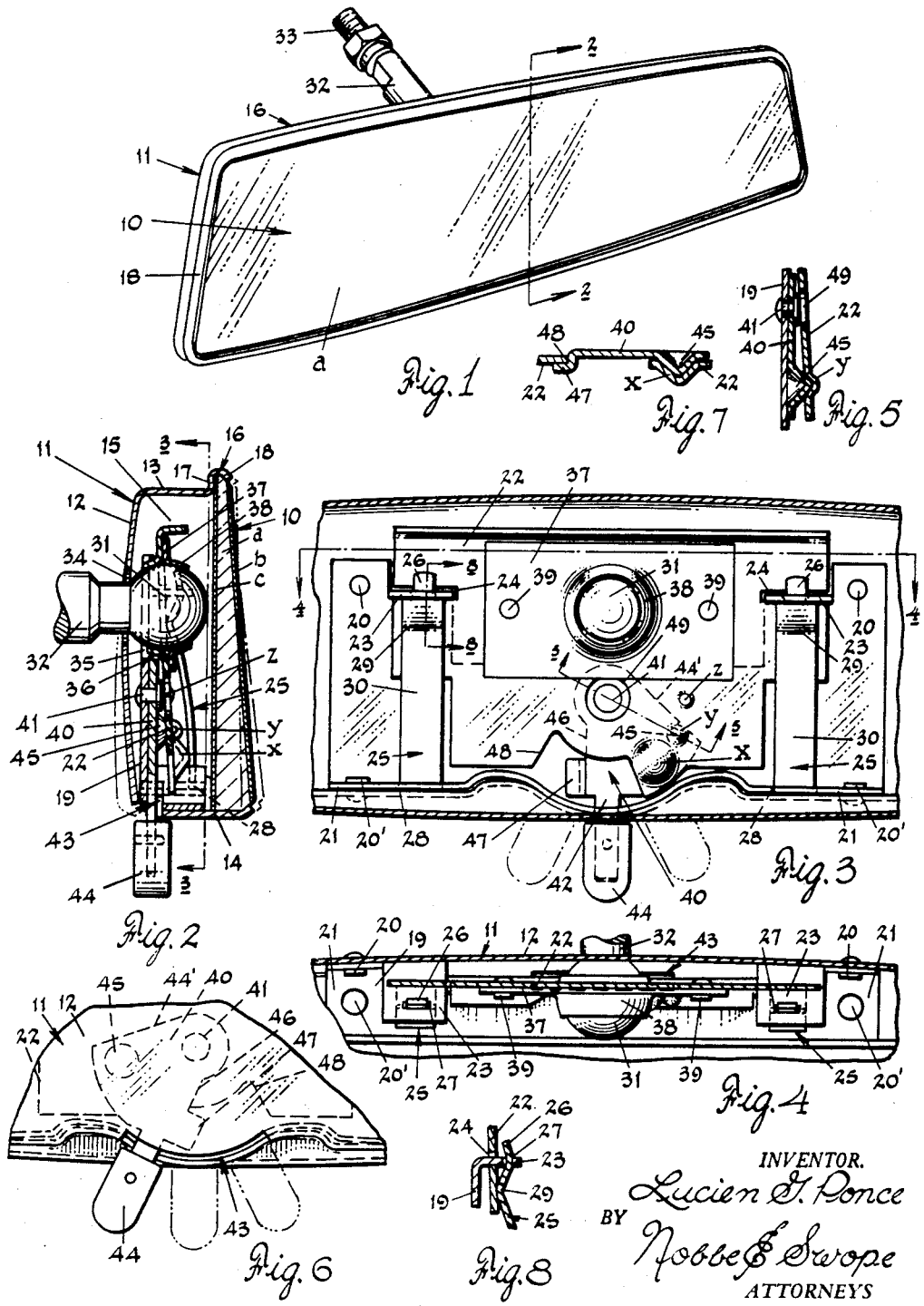

2,839,964

REAR VIEW MIRROR

Lucien G. Ponce, Weirton, W. Va., assignor to Libbey-Owens-Ford Glass Company, Toledo, Ohio, a corporation of Ohio Application April 8, 1954, Serial No. 421,863

11 Claims. (Cl. 88—98)

The present invention relates to improvements in rear view mirrors for automobiles and the like.

The primary purpose in the use of a rear view automobile mirror is of course to provide the driver with a satisfactory view of the rear road under the various conditions of driving. For example, in Patent No. 2,631,498, issued March 17, 1953 to Dwight W. Barkley, there is disclosed a prismatic rear view mirror which provides the automobile driver with a personal selection of three or more intensities of images of the rear road conditions. Such a mirror permits the driver to make a choice of images of various brightness, each image being of the common limited rear field of view so as to obtain maximum visibility with the minimum glare best suited to his particular personal eye glare tolerance and visual acuity under all the varying light intensities present under modern night and day driving conditions.

In the above patent, the choice of image intensity suitable to the driver is made by his selectively positioning the prismatic rear view mirror by angular adjustment to alternately locate the various images of differing intensities of the same limited common rear field of view in the normal line of sight of the driver as he sits in driving position in the car. Thus, the rear view mirror provides a choice of at least three image intensities which may be, for example, of over 30% for normal day driving, between 10% and 30% approximately for normal night driving, and of over 4.5% up to 12% approximately for abnormal glare driving conditions, of the incident light falling upon the rear view mirror and coming from the rear view of the road, etc.

An important object of this invention is the provision of a prismatic rear view mirror of the general type disclosed in the above patent embodying novel and improved means for mounting and angularly adjusting the mirror to predetermined positions to selectively locate any one of three different image intensities of the same limited common rear field of view in the normal line of sight of the driver.

Another object of this invention is the provision of such a rear view mirror embodying simple yet effective means by which the driver may angularly adjust the mirror to predetermined positions at will to selectively locate in the predetermined position of the driver's eyes the first, second and third images of the common rear field of view.

Another object of the invention is the provision of such a rear view mirror which can be readily and conveniently tilted upwardly and downwardly by the driver within a controlled arc to bring any one of the three images of various intensities into line of vision of the driver, and including means for insuring maintenance of the mirror in selected position.

A further object of the invention is the provision of such a rear view mirror embodying means enabling tilting movement of the mirror to any one of three positions by finger tip control to give the desired intensity of image, without disturbing the adjustment of the mirror in relation to the driver, and for effectively maintaining the mirror in selected position.

A still further object of the invention is the provision of cam actuated means by which shifting of the mirror to its different positions may be easily and quickly effected with a minimum of effort and attention on the part of the driver, together with means coacting with said actuating means for positively locating the mirror in its selected position and for preventing accidental displacement therefrom.

Other objects and advantages of the invention will become more apparent during the course of the following description when taken in connection with the accompanying drawings.

In the drawings wherein like numerals are employed to designate like parts throughout the same:

Fig. 1 is a perspective view of a rear view mirror constructed in accordance with the invention;

Fig. 2 is a vertical sectional view taken substantially on line 2—2 of Fig. 1;

Fig. 3 is a fragmentary vertical sectional view taken substantially on line 3—3 of Fig. 2;

Fig. 4 is a fragmentary horizontal sectional view taken substantially on line 4—4 of Fig. 3;

Fig. 5 is a detail sectional view of the actuating means taken substantially on line 5—5 of Fig. 3;

Fig. 6 is a fragmentary rear view of the actuating mechanism for the rear view mirror;

Fig. 7 is a sectional view of a portion of the actuating mechanism of the invention; and Fig. 8 is a detail section taken substantially on line 8—8 of Fig. 3.

With reference now to the drawing, there is disclosed a mirror element 10 which comprises a support body *a* of glass or other transparent material which is wedge shaped in vertical cross section and is provided with front and rear reflecting surfaces *b* and *c* respectively in the form of coatings arranged one behind the other, with either their lower or upper edges in converging relationship and with the other edges more widely spaced apart. Thus, the mirror reflective means or coatings may be arranged upon a prism which may be of glass or plastic and disposed in non-parallel relationship or upon sheets of the same arranged in prism form.

The angle between the two mirror reflective coatings *b* and *c* which form a front mirror and a rear mirror is preferably of the order of three and one-fourth degrees, although, there may readily be used an angular separation between the two mirrors of from two to ten degrees or more, the larger angular separation of close to ten degrees being preferable when a prism composed of glass sheets is used.

By way of example, the back surface of the support body *a* may carry a highly reflective mirror film *c* which, as a coating on a plane sheet of glass, would have a reflectivity preferably ranging from 50% to 95% or more and which is preferably opaque. On the other hand, the front surface of the support body may carry a reflective film means *b* which is preferably semi-transparent, of substantially no light absorption, and has a reflectivity of 10% to 30% for use in normal night driving and in daytime driving under snow and sun glare conditions.

According to the invention, the mirror element 10 is carried by a substantially rectangular housing or case 11 having a back wall 12, top wall 13, bottom wall 14 and opposite end walls 15. The case is open at the front and has a forwardly directed peripheral flange 16 therearound which overlays the edges of the mirror element and serves to hold it rigidly in position to close the front of the case. As will be seen in Fig. 2, the flange 16 includes a substantially vertical wall portion 17 which engages the rear surface of the mirror element to hold it against rearward displacement, and a bent forward edge portion 18 which engages corresponding beveled edge portions of the mirror element to hold it against forward displacement.

The case 11 is carried by a mounting plate 19 which is suitably secured to the back wall 12 of the case by rivets or the like 20. The mounting plate is provided along its lower edge with a forwardly directed flange 21 conforming to the bottom wall 14 of the case and secured thereto by rivets or the like 20'. The mounting plate 19 is hingedly connected to a vertical stationary support plate 22, which is disposed in front of and spaced from said mounting plate. More particularly, there is provided at the upper edge of the mounting plate spaced forwardly bent tabs 23 which are received in horizontal slots 24 at the opposite ends of the support plate 22 whereby the mounting plate 19, and case 11 attached thereto, are pivotally carried by the support plate 22. The tabs 23 are maintained in position in the slots 24 of the support plate by means of leaf springs 25 provided at the upper ends with ears 26 which extend through slots 27 formed in the tabs 23 of mounting plate 19. The lower ends of the springs 25 are held in slots 28 formed in the forwardly directed flange 21 of the mounting plate 19, while each spring is formed adjacent its upper end with a kinked portion 29 bearing against the support plate 22. Thus, as best seen in Figs. 2 and 8, the ears 26 of leaf springs 25 serve to prevent the tabs 23 from sliding out of engagement with the slots 24 of the support plate 22, and by virtue of the kinked portion 29 and bowed portion 30, the spring acts to bias the lower portion of the mounting plate 19 forwardly toward the lower portion of the support plate 22. In other words, the tabs 23 bear upon the bottoms of the slots 24 which constitute the hinge points about which the mounting plate can be rocked to enable tilting of the case and the mirror carried thereby as a unit upwardly and downwardly relative to said stationary support plate to obtain the desired image intensity.

The stationary support plate 22 is carried by a truncated ball 31, provided at the outer end of a supporting arm 32, the opposite end of which terminates in a threaded stud or the like 33 by which the mirror may be fixedly secured to the automobile.

The ball 31 extends through an opening 34 in the back wall 12 of case 11 and through a complementary opening 35 in mounting plate 19, being secured in a spherical seat or bearing 36 in the support plate 22 by means of a metal strap 37 having a bearing portion 38 conforming to and engaging said ball. The opposite ends of the strap 37 are secured to the support plate 22 by rivets or the like 39. In use, the support plate 22 and strap 37 coact to grip the ball 31 with sufficient pressure to maintain the said support plate stationary except when it is desired to adjust the mirror assembly bodily with respect to said ball to position the mirror for different drivers.

The desired tilting of the mirror 10 is effected by a semi-circular cam plate 40 arranged within the case 11 in front of the mounting plate 19 and pivoted thereto as at 41. More particularly, the cam plate 40 has a depending actuator arm 42 which extends through aligned slots 43 formed in the bottom flange 21 of the mounting plate and bottom wall 14 of the case and carries at its lower end outwardly of the case a knob or finger engaging member 44. Struck forwardly from the cam 40 adjacent the side edge 44' thereof is a convex projection or protuberance 45 adapted to be selectively received within depressions or dimples $x$, $y$ and $z$ of decreasing size provided in the support plate 22. The depressions $x$, $y$ and $z$ are arranged in an arcuate path so that as the cam plate 40 is swung about its pivot 41, the finger 45 passes successively from the depression $x$ into the smaller depression $y$ and then into the still smaller depression $z$ giving the effect of a wedge action between the support plate 22 and the mounting plate 19. Thus, this wedge action causes the mounting plate 19 to pivot away from the support plate 22 to move the case 11 and mirror 10 associated therewith to one of the three reflective positions ($x$, $y$ and $z$) mentioned hereinabove and indicated by the solid and phantom lines in Fig. 2. When the mirror and case have been located in the desired reflective position, they are maintained in such position by the cooperation of the cam protuberance 45 and the depression $x$, $y$ or $z$ which yieldably restrains movement of the cam plate 40.

Prior to using the invention as described above to locate the mirror in different reflective positions due to changing light conditions, it is necessary that the mirror assembly be first bodily adjusted to suitably locate the mirror element for the particular driver. This is accomplished by locking the cam plate 40 and with it the mounting plate 19 and case 11, to the stationary support plate 22 so that upon adjustment of the case by the driver, the said support plate will be similarly adjusted upon the supporting ball 31. For this purpose, there is provided along the side edge 46 of cam plate 40 a forwardly offset tongue 47 which is adapted to overlay the front surface of the support plate 22 along the notched edge 48 thereof (Fig. 7) when the said actuator arm 42 is in the position corresponding to reflective position $x$. Thus when it is desired to lock the cam plate 40 to the support plate 22, the knob 44 on the actuator arm 42 is swung by the operator in a clockwise direction to move the cam protuberance 45 to engage the depression $x$ which corresponds to the normal day driving position of the mirror. At this position, the tongue 47 overlaps the edge 48 of the support plate 22 as shown in Fig. 7 and the case 11 and the mirror 10 may be bodily adjusted by the driver about the support ball 31. Also, when in this position, the cam plate 40 may flatly abut the support plate 22 as the flat end of the pivot pin 41 is received in an aperture 49 provided in said support plate.

When using the invention, the case and mirror element are first bodily adjusted by the driver, as described above, by first locking the case 11 and cam plate 40 to the support plate 22 and then bodily adjusting the case about the ball 31 to the proper angular position for the driver of the automobile. Having adjusted the mirror to the proper angular position, the mirror element 10 may be tilted by rocking the mounting plate relative to the support plate to selectively bring any one of the three reflective light beams to the driver's eyes. This tilting of the mirror can be easily and quickly effected by the driver by simply engaging the knob 44 to swing the cam plate 40 in the desired direction to move the cam protuberance 45 to engage the desired depression $x$, $y$ or $z$ depending upon the requirements of the driver. For example, when the protuberance 45 engages depression $x$, the mirror is in its normal day driving position. However, when it is desired to change the mirror to the normal night driving position, the protuberance is moved to depression $y$, and for driving under abnormal glare conditions into depression $z$. It will be apparent that while this tilting of the mirror is taking place, the position of the mirror case upon the ball 31 will not be affected as it is held in a substantially rigid preadjusted position by frictional engagement of the strap 37 with the ball 31.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In a rear view mirror for automobiles, a substantially vertical support plate, a case surrounding said support plate and having an opening at the front thereof, a mirror element secured in and closing said opening, a mounting plate secured to said case, means for hingedly supporting said mounting plate on said support plate, means carried by said support plate for attachment to an automobile, means for forcing the mounting plate and vertical support plate angularly toward one another, and cam means disposed within the case between said mounting plate and said support plate for rocking the said case and mirror element as a unit relative to said support plate.

2. In a rear view mirror as defined in claim 1, in which the support plate is provided with a plurality of depressions of, and in which said cam means is provided with means for selectively engaging said depressions.

3. In a rear view mirror as defined in claim 2, in which said depressions are arranged in an arcuate path on said support plate, and said cam means is provided with a projecting portion for selectively engaging said depressions.

4. In a rear view mirror for automobiles, a case having an opening at the front thereof, a mirror element secured in and closing said opening, a substantially vertical support plate arranged within said case, a mounting plate secured to said case and hingedly carried by the support plate, means carried by said support plate for attachment to an automobile, spring means for urging the mounting plate and support plate angularly toward one another, means carried by said mounting plate and engaging said support plate for tilting said case and mirror element as a unit relative to the said support plate, and means carried by said support plate for maintaining the mirror element and case in adjusted tilted position.

5. In a rear view mirror as defined in claim 4, in which said means for tilting the case is provided with means for locking said support plate and case together in a fixed relative position to enable bodily adjustment of the mirror and case.

6. In a rear view mirror for automobiles, a substantially vertical support plate, a housing surrounding said support plate, a mirror element carried by said housing, a mounting plate attached to said housing, means carried by said mounting plate for hingedly mounting said housing on said support plate, means carried by the support plate for attachment to an automobile, means for urging said mounting plate toward said support plate, and means disposed between said support plate and said mounting plate for rocking said housing and mirror element as a unit relative to the support plate.

7. In a rear view mirror device for automobiles, a substantially vertical support plate, a housing surrounding said support plate, a mirror element carried by said housing, a mounting plate attached to said housing, means carried by said mounting plate for hingedly mounting said housing on said support plate, means carried by the support plate for attachment to an automobile, spring means for urging the mounting plate and support plate angularly toward one another, cam means carried by the mounting plate and having a portion thereof engaging said support plate and serving to wedge the said mounting plate angularly away from said support plate to rock the said case and mirror element relative to said support plate.

8. In a rear view mirror as defined in claim 7, in which said cam means includes an offset tongue portion which is adapted to overlap and engage said support plate in at least one position of said cam means for locking said support plate and case together to enable bodily adjustment of the case and mirror element.

9. In a rear view mirror for automobiles, a substantially vertical support plate, a case surrounding said support plate and having an opening at the front thereof, a mirror element secured in and closing said opening, a mounting plate secured to said case, means for hingedly supporting said mounting plate on said support plate, means carried by said support plate for attachment to an automobile, and cam means disposed within the case between said mounting plate and said support plate for rocking the said case and the mirror element as a unit relative to said support plate, said support plate being provided with a plurality of depressions, and said cam means being provided with means for selectively engaging said depressions.

10. In a rear view mirror as defined in claim 9, in which said depressions are arranged in an arcuate path on said support plate, and said cam means is provided with a projecting portion for selectively engaging said depressions.

11. In a rear view mirror device for automobiles, a substantially vertical support plate, a housing surrounding said support plate, a mirror element carried by said housing, a mounting plate attached to said housing, means carried by said mounting plate for hingedly mounting said housing on said support plate, means carried by the support plate for attachment to an automobile, cam means carried by the mounting plate and having a portion thereof engaging said support plate and serving to wedge the said housing away from said support plate to rock the said housing and mirror element relative to said support plate, said cam means including an offset tongue portion which is adapted to overlap and engage said support plate in at least one position of said cam means for locking said support plate and housing together to enable bodily adjustment of the housing and mirror element.

References Cited in the file of this patent

UNITED STATES PATENTS

| | | |
|---|---|---|
| 2,052,770 | Hofer | Sept. 1, 1936 |
| 2,420,259 | McNamara | May 6, 1947 |
| 2,504,386 | Brady | Apr. 18, 1950 |
| 2,669,159 | Rogers | Feb. 16, 1954 |